United States Patent [19]

Helm et al.

[11] 3,914,204

[45] Oct. 21, 1975

[54] METHOD FOR MAKING HEAT-HARDENABLE THICKENED EPOXY RESIN MASSES

[75] Inventors: Dietrich Helm; Horst Schepp, both of Unna, Germany

[73] Assignee: Schering AG., Berlin and Bergkamen, Germany

[22] Filed: July 19, 1974

[21] Appl. No.: 490,058

[30] Foreign Application Priority Data

July 28, 1973 Germany.............................. 2338430

[52] U.S. Cl. ......................... 260/47 EN; 260/59 EP
[51] Int. Cl.² ......................................... C08G 30/16
[58] Field of Search .................. 260/47 EN, 59, 2 N

[56] References Cited
UNITED STATES PATENTS

| | | | |
|---|---|---|---|
| 2,909,448 | 10/1959 | Schroeder | 260/2 X |
| 3,515,698 | 6/1970 | Mauz | 260/47 X |
| 3,728,302 | 4/1973 | Helm | 260/47 X |

*Primary Examiner*—Melvin Goldstein
*Assistant Examiner*—T. Pertilla
*Attorney, Agent, or Firm*—Curtis, Morris & Safford

[57] ABSTRACT

An improved method for making heat-hardenable thickened epoxy resin masses prepared from at least one liquid epoxy resin, a monoamine or diamine thickening agent, a tertiary amine accelerator, and finely divided dicyandiamaide, wherein about 0.05 to about 0.3 equivalent of the epoxy resin is pre-combined with one equivalent of the thickening amine to form a hardening adduct which is then combined with the remaining epoxy resin.

1 Claim, No Drawings

METHOD FOR MAKING HEAT-HARDENABLE THICKENED EPOXY RESIN MASSES

The present invention relates to a method for making heat-hardenable thickened epoxy resin masses.

A number of different processes for the preparation of heat-hardenable epoxy resin masses are already known. In one case, high molecular weight — therefore solid — epoxy resins are pulverized and are ground together with finely-divided hardening agents, optionally with the addition of fillers, fibers, and the like. Since the epoxy resin and the hardener are both present in solid form, masses of this type are stable on storage but are nevertheless relatively quickly hardenable.

In other processes, the epoxy resin masses are present in the so-called "B-stage". These are prepared by homogeneously dissolving an epoxy resin and an amine hardener in each other and pre-reacting them. The pre-reacting, however, is only carried out until a thermoplastic stage is reached. In this stage, further hardening is to a large extent discouraged by the congealed state of the product, whereby a limited storage stability can be achieved. However, these resin masses have the disadvantage that they are sensitive to atmospheric moisture and to carbon dioxide because of the presence of free amino groups therein.

A further method which is commonly in practice involves melting a solid epoxy resin and 1-cyanoguanidine (di-cyandiamide) together, optionally in the presence of tertiary amines, for example in the preparation of powdered lacquers. Alternatively, these materials are dissolved in solvents such as ketones and then fibrous webs, for example fiberglass fabrics, are saturated therewith and the solvent is subsequently driven off. In this way, stiff, pre-impregnated materials, so-called "prepregs", are obtained.

All epoxy resin formulations of this type have the disadvantage that the intermediate or partially finished products are exceptionally hard and brittle and expensive solutions of resins and hardeners must in part be used in their preparation.

In the field of unsaturated polyester resins, so-called "resin mats" are of course known. These materials may be worked up into a roll and exhibit still other handling advantages. The "resin mat" comprises a glass fiber mat which is saturated with a filled unsaturated polyester resin. By the use of small amounts of magnesium oxide or the like, the polyester resin can be thickened within a period of hours to days to a soft, only weakly tacky condition. In order to hinder any possible blocking, the resin mat is rolled up with intermediate layers of polyethylene film.

The results obtained with resin mats comprising unsaturated polyester resins are, however, not satisfactory for all fields of use.

U.S. Pat. No. 3,728,302 is directed to the problem of preparing soft, storage-stable, epoxy resin masses as tack-free as possible, which masses will rapidly harden when heated. A further object of the invention disclosed in this patent is to overcome the above-described disadvantage of brittle-hard epoxy resin masses, that is the roundabout route employing resin solutions or resin melts was to be avoided.

According to this patent, heat-hardenable thickened epoxy resin masses are prepared from mixtures of a. a liquid epoxy resin comprising an aromatic polyglycidyl ether;

b. finely-divided dicyandiamide in amounts of about 0.1 to 0.6 mol, preferably about 0.25 mol, per equivalent of epoxy compound in excess of those epoxy equivalents involved in thickening reactions with an amine thickener described below; and c. a tertiary amine accelerator in an amount from about 0.2 to 2 percent by weight, calculated on the total amount of epoxy resin employed. Optionally fillers and/or reinforcing agents, particularly fibers or fibrous webs, and/or pigments and auxiliaries can be included.

These mixtures are prereacted, i.e. thickened at temperatures between about 20°C. and about 120°C. in the presence of at least one aliphatic, araliphatic, or cycloaliphatic amine, particularly monoamines and diprimary, disecondary, and/or mixed primary/secondary diamines in amounts providing from about 0.05 to about 0.8 equivalent of amine hydrogen per equivalent of epoxy compound.

According to the present invention, an improved method for making such heat-hardenable masses has been found, in which method from about 0.05 to about 0.3 equivalent of the epoxy resin, which may have an epoxy equivalent weight up to about 400, is precombined with one equivalent of the thickening amine in an addition reaction.

The method of the present invention achieves a surprising combination of advantages as compared with the process disclosed in U.S. Pat. No. 3,728,302. Thus, it is possible to decrease the peak temperature when preparing large batches in order to prevent premature initiation of the hardening reaction, which latter is brought about at high temperatures by the presence of dicyandiamide. This is particularly true if amines are employed in amounts of the upper level in the range mentioned above for the thickening reaction while the amount of heat-conducting fillers is low, as would be the case, for example, for coating powders.

The pre-added amine component (hardening adduct) can also be better and more safely handled by the individual processer. Since the amine partial pressure of the adduct is considerably lower than is the case when a non-pre-added amine is employed, the danger of skin irritations and allergies is reduced. Also, simple mono- or di-amines are watery and can be easily spilled or sprayed during handling with resultant damage to the skin and clothing. This danger is practically absent when a relatively viscous hardening adduct is employed.

It has further been found that the greater viscosity of the amine-hardener-adduct surprisingly renders it more readily miscible, rather than less miscible, with the also relatively viscous epoxy resin component, which may optionally contain fillers and/or pigments. A homogeneous mixture can be obtained more easily and in a shorter time. On the other hand, because of the greater viscosity and the greater shearing forces, pigments and/or fillers can be worked into the mixture of the binders more thoroughly or more intensively.

As the resin for the epoxy resin masses of the invention, liquid epoxy resins comprising aromatic polyglycidyl ethers are generally suitable, particularly the liquid diglycidyl ethers of bisphenols, for example of diphenylol propane or diphenylol methane, and of aldehyde-condensation products (novolacs). Further, those epoxy resins prepared by the use of methylepichlorohydrin instead of epichlorohydrin are suitable.

The commercially available epoxy resins show somewhat different molecular weights: they are nevertheless all suitable in principle, so long as the epoxy resin or the epoxy resin formulation is capable of flow at room temperature.

The epoxy resin used, on the one hand, for the pre-addition and that used, on the other hand, for thickening, can be the same or different. The epoxy resins used for the pre-addition preferably have an epoxy equivalent weight up to about 400.

Of the large number of suitable tertiary amines, several particularly advantageous and easily accessible species are named hereafter: triethylamine; tributylamine; N,N'-tetramethylethylene diamine; dimethylethanolamine; diethyl-ethanolamine; benzyl dimethylamine; (dimethyl-aminomethyl)-phenol; tris-(dimethyl-aminomethyl)-phenol; and the like. Tertiary amines, which are latently bound in molecular sieves and which are first freed at elevated temperatures can also be employed. By using N-aminoethyl piperazine as an accelerator, the amount of the amine used for thickening can be correspondingly reduced.

A number of aliphatic, araliphatic, and cycloaliphatic mono- and/or di-amines can be employed for thickening. However, in practice, availability, vapor pressure, odor, sensitivity to carbon dioxide, and the toxicity of these amines, as well as their influence on the storage stability of the masses produced according to the present invention and the resistance to heat of the hardened masses must be taken into consideration. From this viewpoint, primary aliphatic, araliphatic, and cycloaliphatic monoamines which are particularly advantageous are hexylamine, cyclohexylamine, ethanolamine, propanolamine, and benzylamine. As diamines, diprimary diamines, disecondary diamines, and/or mixed primary/secondary diamines are employed. For the aforementioned reasons and because of their easy accessibility and economy, materials such as trimethylhexamethylene diamine; 3,3'-dimethyl-4,4'-diamino-dicyclohexyl-methane; and particularly 3-(aminomethyl)-3,5,5-trimethyl-1-cyclohexylamine are preferred. Other cycloaliphatic or mixed aliphatic-cycloaliphatic diamines such as N-cyclohexylpropylene diamine can also be employed. However, with the diamines 3,3'-dimethyl-4,4'-diamino-dicyclohexylmethane and 3-(aminomethyl)-3,5,5-trimethyl-1-cyclohexylamine (common name "isophorone diamine"), a better resistance to heat is attained.

In preparing those soft and putty-like epoxy resin masses of the invention which comprise bisphenol glycidyl ethers, it can be advantageous to employ cycloaliphatic diamines together with aliphatic or cycloaliphatic monoamines because in this manner soft masses are obtained which show particularly low tack. In particular, a low degree of tack can be attained by the use or co-use of polyglycidyl ethers of novolacs.

Quite generally, when monoamines are employed alone or in combination with other amines, the amount of amine is most often in the upper aforementioned equivalence region than when diamines are employed. Amounts of at most about 0.4 equivalent of amino hydrogen per equivalent of epoxy compound can be used when diprimary diamines are employed or co-employed without losing the thermoplastic condition.

When coating powders are manufactured, the amount of the amine used for thickening should be in the upper equivalence region, preferably between 0.5 and 0.8 equivalent of amino hydrogen per equivalent of epoxy compound, with a view to the good milling properties and freedom from blocking of the powder. In this case, the amount of diprimary diamines should be kept small.

The heat-hardenable epoxy resin masses according to the invention can be used without further additives as, for example, adhesives, coatings, forming masses, and the like. When used for molding or extrusion, they may as a rule contain the conventional fillers and/or reinforcing agents, as well as optional pigments and other auxiliaries such as lubricating agents. The brittle-hard masses are particularly suitable, optionally with the addition of pigments and auxiliaries after milling, as coating powders applied according to various known techniques.

A better understanding of the present invention and of its many advantages will be had by referring to the following specific examples, given by way of illustration.

EXAMPLE 1

A. Preparation of a Hardening Adduct 320 g (3.24 mols) of cyclohexylamine and 300 g (1.24 epoxy equivalents) of a diglycidyl ether prepared from 4,4'-dihydroxy-diphenyl-propane-2,2 and epichlorohydrin are put into a 1 liter three-necked flask provided with a stirrer, a reflux condenser and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of a diglycidyl ether similiarly prepared as described in part (A), 20 g (0.95 NH-equivalent) of dicyandiamide, 1.4 g of an acrylate resin flowing agent and 234 g of a titanium dioxide pigment are pre-mixed by hand and subsequently mixed twice on a three-roll mill. The color paste prepared in this manner is completely stable at room temperature.

In order to thicken this paste, 154 g of the hardener described above are added and mixed in well with rapid stirring for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 4 g of amorphous very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow, and very good adhesion. If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

EXAMPLE 2

A. Preparation of a Hardening Adduct 347 g (3.24 mols) of benzylamine and 300 g (1.24 epoxy equivalents) of a diglycidylether prepared from 4,4'-dihydroxy-diphenyl-propane-2,2 and epichlorohydrin are put into a 1 liter three-necked flask provided with a stirrer, a reflux condenser, and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of the diglycidylether of example 1(B), 20 g (0.95 NH-equivalent) of dicyandiamide, 1.4 g of an acrylate resin flowing agent and 237 g of a titanium dioxide pigment are pre-mixed by hand and subsequently mixed twice on a three-roll mill. The color paste prepared in this manner is completely stable at room temperature.

In order to thicken this paste, 160.5 g of the hardener described above are added and mixed in well with rapid stirring for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 4 g of amorphous, very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow and very good adhesion.

If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

EXAMPLE 3

A. Preparation of a Hardening Adduct 418 g (3.24 mols) of octylamine and 300 g (1.24 epoxy equivalents) of a diglycidylether, prepared from 4,4'-dihydroxy-diphenyl-propane-2,2 and epichlorohydrin are put into a 1 liter three-necked flask provided with a stirrer, a reflux condenser and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of the diglycidylether of example 1(B), 20 g (0.95 NH-equivalent) of dicyandiamide, 1.4 g of an acrylate resin flowing agent and 244 g of a titanium dioxide pigment are pre-mixed by hand and subsequently mixed twice on a three-roll mill. The color paste prepared in this manner is completely stable at room temperature.

In order to thicken this paste, 178 g of the hardener described above are added and mixed in well with a rapid stirring for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 4.2 g of amorphous, very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow and very good adhesion.

If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

EXAMPLE 4

A. Preparation of a Hardening Adduct 418 g (3.24 mols) of 2-ethylhexylamine and 300 g (1.24 epoxy equivalents) of a diglycidylether, prepared from 4,4'-dihydroxy-diphenyl-propane-2,2 and epichlorohydrin are put into a 1 liter three-necked flask provided with a stirrer, a reflux condenser and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of the diglycidylether of example 1(B), 20 g (0.95 NH-equivalent) of dicyandiamide, 1.4 g of an acrylate resin flowing agent and 244 g of a titanium dioxide pigment are pre-mixed by hand and subsequently mixed twice on a three-roll mill. The color paste prepared in this manner is completely stable at room temperature.

In order to thicken this paste, 178 g of the hardener described above are added and mixed in well with a rapid stirring for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 4.2 g of amorphous, very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow and very good adhesion.

If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

EXAMPLE 5

A. Preparation of a Hardening Adduct 366 g (3.24 mols) of 2-methyl-cyclohexylamine and 300 g (1.24 epoxy equivalents) of a diglycidylether, prepared from 4,4'-dihydroxy-diphenyl-propane-2,2 and epichlorohydrin are put into a 1 liter three-necked flask provided with a stirrer, a reflux condenser and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of a diglycidylether, similiarly prepared as described in part (A), 20 g (0.95 NH-equivalent) of dicyandiamide, 1.4 g of an acrylate resin flowing agent and 238 g of a titanium dioxide pigment are pre-mixed by hand and subsequently mixed twice on a three-roll mill. The color paste prepared in this manner is completely stable at room temperature.

In order to thicken this paste, 165 g of the hardener described above are added and mixed in well with a rapid stirring for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 4 g of amorphous, very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow and very good adhesion.

If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

EXAMPLE 6

A. Preparation of a Hardening Adduct 337 g (6.46 equivalents) of an amine mixture consisting of benzylamine and a mixture of 2,4,4- and 4,2,2-trimethylhexamethylene diamine isomers in a molar ratio of 14:1 and 154 g (0.636 epoxy equivalents) of a diglycidylether, prepared from 4,4'-dihydroxy-diphenyl-propane-2,2 and epichlorohydrin are put into a 1 liter three-necked flask provided with a stirrer, a reflux condenser and a gas inlet. The contents are warmed to 80°C. while stirring and with the introduction of a weak stream of nitrogen. At about 80°C., an exothermic reaction begins. The temperature is permitted to rise to about 130°C. After 2 hours, the reaction product is allowed to cool and 7.2 g of benzyldimethylamine are added while stirring.

B. Preparation of a Coating Powder 400 g (2.18 epoxy equivalents) of the diglycidylether of example 1(B), 20 g (0.95 NH-equivalent) of dicyandiamide, 1.4 g of an acrylate resin flowing agent and 216 g of a titanium dioxide pigment are pre-mixed by hand and subsequently mixed twice on a three-roll mill. The color paste prepared in this manner is completely stable at room temperature.

In order to thicken this paste, 110 g of the hardener described above are added and mixed in well with a rapid stirrer for about 15 minutes. This causes the temperature to rise to about 40°C. The highly viscous mass is poured out into dishes, which can be lined with a polyethylene film, about 5 cm deep. After about 30 minutes, the mass has exceeded its temperature maximum of about 80°C. and is then tempered in a drying oven at 100°C. for 3 to 4 hours for completion of the thickening reaction. After cooling, the brittle hard product is broken up and is subsequently finely ground in a suitable mill with the addition of 3.7 g of amorphous very finely-divided $SiO_2$ ("Aerosil").

The powder so obtained remains free-flowing and workable for several months at 40°C. After the powder is sprayed onto a surface electrostatically and fused, hard coatings are obtained which are characterized by high luster, very good flow and very good adhesion.

If the material is worked up without pre-addition, i.e. if the complete mixture is homogenized on a rolling mill, the grinding time must be lengthened in order to achieve the same end properties, for example gloss. Further, during the pre-reaction a temperature maximum far above 100°C. is attained if the layer thicknesses are of the order of about 5 centimeters. For this reason, partial cross-linking takes place, which is recognizable by a completely unsatisfactory flow of the finished coating.

What is claimed is:

1. In the method of making a heat-hardenable thickened epoxy resin mass by thickening, at a temperature between about 20°C. and about 120°C. and in the presence of at least one aliphatic, araliphatic, or cycloaliphatic monoamine or diamine, a mixture of:
  a. a liquid epoxy resin comprising an aromatic polyglycidyl ether;
  b. finely-divided dicyandiamide; and
  c. a tertiary amine accelerator, said monoamine or diamine being present in an amount providing from about 0.05 to about 0.8 equivalent of amino hydrogen per equivalent of epoxy compound, said dicyandiamide being present in an amount of from about 0.1 mol to about 0.6 mol per equivalent of epoxy compound in excess of that reacting with said monoamine or diamine, and said tertiary amine being present in an amount from about 0.2 to about 2 percent by weight of said epoxy resin; the improvement wherein a portion of said epoxy resin, having an epoxy equivalent weight up to about 400, is first reacted with said aliphatic, araliphatic, or cycloaliphatic monoamine or diamine in an amount of about 0.05 to about 0.3 equivalent of epoxy resin per equivalent of amine to form a hardener adduct, and said hardener adduct is then combined with the balance of said mixture and the mixture is thickened.

* * * * *